United States Patent
Majnemer et al.

(10) Patent No.: US 8,868,531 B2
(45) Date of Patent: Oct. 21, 2014

(54) CONCURRENT ACCESS METHODS FOR TREE DATA STRUCTURES

(71) Applicant: Apple Inc., Cupertino, CA (US)

(72) Inventors: David A. Majnemer, Great Neck, NY (US); Wenguang Wang, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 29 days.

(21) Appl. No.: 13/653,367

(22) Filed: Oct. 16, 2012

(65) Prior Publication Data

US 2014/0074841 A1    Mar. 13, 2014

Related U.S. Application Data

(60) Provisional application No. 61/699,173, filed on Sep. 10, 2012.

(51) Int. Cl.
  *G06F 17/00*      (2006.01)
  *G06F 17/30*      (2006.01)

(52) U.S. Cl.
  CPC .... *G06F 17/30327* (2013.01); *G06F 17/30008* (2013.01)
  USPC ............................ 707/704; 707/737; 707/797

(58) Field of Classification Search
  CPC ................... G06F 17/30961; G06F 17/30864; G06F 17/30327; G06F 17/30595
  USPC .................. 707/797, 704, 814, 747, E17.005, 707/E17.007, E17.05, E17.002, E17.087, 707/E17.012; 711/162, 163
  See application file for complete search history.

(56) References Cited

U.S. PATENT DOCUMENTS

| | | | |
|---|---|---|---|
| 4,945,475 A | | 7/1990 | Bruffey et al. |
| 5,506,983 A | * | 4/1996 | Atkinson et al. ............... 707/797 |
| 5,715,441 A | * | 2/1998 | Atkinson et al. ............... 707/801 |
| 5,842,196 A | * | 11/1998 | Agarwal et al. ........ 707/E17.005 |
| 5,987,506 A | * | 11/1999 | Carter et al. ............. 707/E17.12 |
| 6,363,387 B1 | * | 3/2002 | Ponnekanti et al. .. 707/E17.005 |
| 6,591,269 B1 | * | 7/2003 | Ponnekanti ............ 707/E17.012 |

(Continued)

OTHER PUBLICATIONS

Kanth, K.V.R. ; Dept. of Comput. Sci., California Univ., Santa Barbara, CA, USA ; Serena, D. ; Singh, A.K.—"Improved concurrency control techniques for multi-dimensional index structures"—Improved concurrency control techniques for multi-dimensional index structures—Mar. 30-Apr. 3, 1998—(pp. 580-586).*

(Continued)

*Primary Examiner* — Anh Ly
(74) *Attorney, Agent, or Firm* — Blakely, Sokoloff, Taylor & Zafman LLP (57) ABSTRACT

In one embodiment, non-transitory computer-readable medium stores instructions for implementing a file system, which include operations for acquiring an exclusive lock on a first node in an ordered tree data-structure, and adding an identifier and index of the first node to a path data structure. If the value of the index in the first node is non-zero, then each exclusive lock acquired between the first node and the root of the tree data structure is released. In any case, the operation proceeds to a second node, which is addressed at the index on the first node. In one embodiment, operations further include acquiring an exclusive lock on the second node, and, if the second node is a leaf node, performing updates to the second node, and then releasing each exclusive lock in the data-structure.

14 Claims, 6 Drawing Sheets

(56) References Cited

U.S. PATENT DOCUMENTS

| | | | |
|---|---|---|---|
| 6,606,626 B1* | 8/2003 | Ponnekanti | 707/E17.005 |
| 7,447,786 B2* | 11/2008 | Loaiza et al. | 709/229 |
| 7,716,182 B2* | 5/2010 | Tewksbary | 707/638 |
| 7,730,101 B2* | 6/2010 | Zhou et al. | 707/797 |
| 7,937,413 B2* | 5/2011 | Tran et al. | 707/803 |
| 8,019,779 B2 | 9/2011 | Teng et al. | |
| 8,086,579 B1* | 12/2011 | Chandrasekaran et al. | 707/704 |
| 8,176,023 B2 | 5/2012 | Graefe | |
| 2005/0066095 A1* | 3/2005 | Mullick et al. | 710/200 |
| 2005/0102255 A1* | 5/2005 | Bultman | 707/1 |
| 2006/0004858 A1* | 1/2006 | Tran et al. | 707/104.1 |
| 2010/0076940 A1* | 3/2010 | Bordawekar et al. | 707/704 |
| 2010/0082664 A1* | 4/2010 | Odaira | 707/769 |
| 2011/0246503 A1* | 10/2011 | Bender et al. | 707/769 |
| 2013/0159336 A1* | 6/2013 | Minamizawa | 707/758 |
| 2013/0204902 A1* | 8/2013 | Wang et al. | 707/797 |
| 2013/0318126 A1* | 11/2013 | Graefe et al. | 707/797 |
| 2014/0074841 A1* | 3/2014 | Majnemer et al. | 707/737 |

OTHER PUBLICATIONS

M Moir, N. Shavit—Handbook of Data Structures . . . , 2007—gimmebar-assets.s3.amazonaws—"Concurrent data structures"—pp. 1-32.*

Donald E. Knuth, The Art of Computer Programming vol. 3 2nd ed. (Sorting and Searching); at § 6.2.4; "Multiway Trees"; pp. 481-491 (1998).

* cited by examiner

Fig. 1

Example Hierarchical Filing System 100
(Prior Art)

CONCURRENT ACCESS METHODS FOR TREE DATA STRUCTURES

CROSS-REFERENCE

The present application is related to, and claims the benefit of provisional application Ser. No. 61/699,173, filed Sep. 10, 2012, which is incorporated herein by reference.

BACKGROUND OF THE DISCLOSURE

In a computer system, information is typically stored on a non-volatile storage device, such as a hard disk drive or solid-state disk, and cataloged in some hierarchical fashion so that the same information is more easily retrieved when desired. A unique code name, such as a file's name, is attributed to a particular body of data element to differentiate it from others, and the desired body of data is retrievable via the use of the appropriate code name associated with that data. The device can search for that code name and retrieve the desired data when that code name is found. Typically, code names associated with particular data contain pointers, which point to areas in memory reserved for mass storage. The various code names and their pointers comprise a cataloging system used to order the data on the mass storage device. In the case of particularly high-density storage devices, multiple trillions of bytes of information can be stored on such devices. If the multitude of files on such storage devices were required to be managed in a serial fashion, storage operations would be excessively time consuming.

One tool used to manage a complex hierarchical file system is the B-tree data structure. The B-tree data structure is well-known in the prior art and is described in *The Art of Computer Programming Volume* 3 (Sorting and Searching); by Donald E. Knuth; at Section 6.4; titled "Multiway Trees"; pp 471-479 (1973). The nodes of a B-tree contain records, wherein each record is comprised of certain information, either pointers or data, and a key associated with that record. However, concurrent access to B-tree data structures, and thus, data storage devices featuring file systems managed by B-tree data structures, has been a particular problem, to which several solutions have been attempted. Particular techniques useful for file system B-trees are discussed in an article by Ohad Rodeh in *B-trees, Shadowing, and Clones*; ACM Transactions on Storage (TOS), Volume 3 Issue 4, February 2008, Article No. 2 and this article is incorporated herein by reference. Several B-tree concurrency techniques are focused on avoiding deadlocks or other broken B-tree states that can result in a file-system malfunction. However, some concurrent access methods can result in a severe performance impact if multiple accesses are attempted.

SUMMARY OF THE DESCRIPTION

In one embodiment, non-transitory computer-readable medium stores instructions for implementing a file system, which include operations for acquiring an exclusive lock on a first node in an ordered tree data-structure, and adding an identifier and index of the first node to a path data structure. If the value of the index in the first node is non-zero, then each exclusive lock acquired between the first node and the root of the tree data structure can be released. In any case, the operation proceeds to a second node, which is addressed at the index on the first node.

In one embodiment, operations further include acquiring an exclusive lock on the second node, and, if the second node is a leaf node, performing updates to the second node, and then releasing each exclusive lock between the second node and the root of the tree data-structure.

Other features of the present invention will be apparent from the accompanying drawings and from the detailed description, which follows.

The above summary does not include an exhaustive list of all aspects of the present invention. It is contemplated that the invention includes all systems and methods that can be practiced from all suitable combinations of the various aspects summarized above, and also those disclosed in the Detailed Description below.

BRIEF DESCRIPTION OF THE DRAWINGS

The present invention is illustrated by way of example, and not limitation, in the figures of the accompanying drawings in which like references indicate similar elements, and in which.

DETAILED DESCRIPTION

Various embodiments and aspects of a hierarchical file system using highly concurrent B-trees will be described with reference to details discussed below; the accompanying drawings will illustrate the various embodiments. It is to be noted that the following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present invention.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software (as instructions on a non-transitory machine-readable storage medium), or a combination of both. Although the processes are described below in terms of some sequential operations, it should be appreciated that some of the operations described may be performed in a different order. Moreover, some operations may be performed in parallel rather than sequentially.

Figure 1:
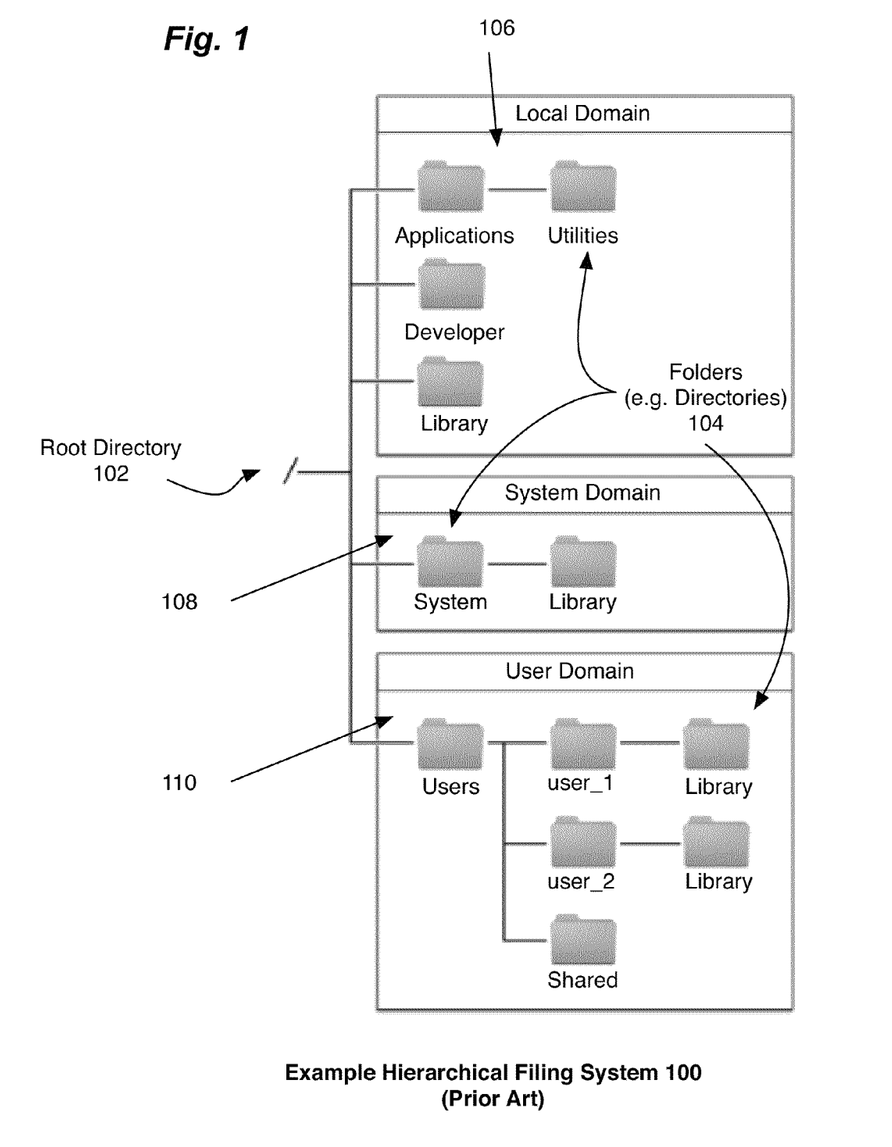
FIG. 1 shows an example of a file system hierarchy as is known in the art.

FIG. 1 shows an Example Hierarchical Filing System 100 that provides a catalog of the data stored in various locations within a data storage device, as is known in the art. The file system uses a cataloging data structure, which can be illustrated as an upside-down tree type structure, topped by a starting directory, which operates as a root directory 102. Numerous other directories 104 (e.g. folders) and files emanate as offspring from the root directory, and a plurality of descendant levels branch downward to provide the hierarchical structure of the filing system. The file system can also be divided into multiple domains, which serve to separate files and resources based on their intended usage. A local domain 106 can contain resources such as applications that are local to the current data processing system and shared among all users of that system. A system domain 108 can contain the system software, which includes the core operating system files that are required by the system to run. A user domain 110 can contain resources specific to the users of the data processing system, and generally contains the primary set of folders and files that the users of the data processing system can access and control.

Various embodiments of a hierarchical file system can implement a cataloging system, as well as other components of the file system, using a B-Tree. In one embodiment, file system cataloging information can be kept in the leaf nodes of the B-tree, and the non-leaf nodes (e.g. the index nodes) of the B-tree can contain information allowing for the searching for particular catalog information using a key for the corresponding file. The key values can be used to identify and catalog various files in the cataloging system, as well as to organize the catalog in the leaf nodes of the B-tree.

Figure 2:
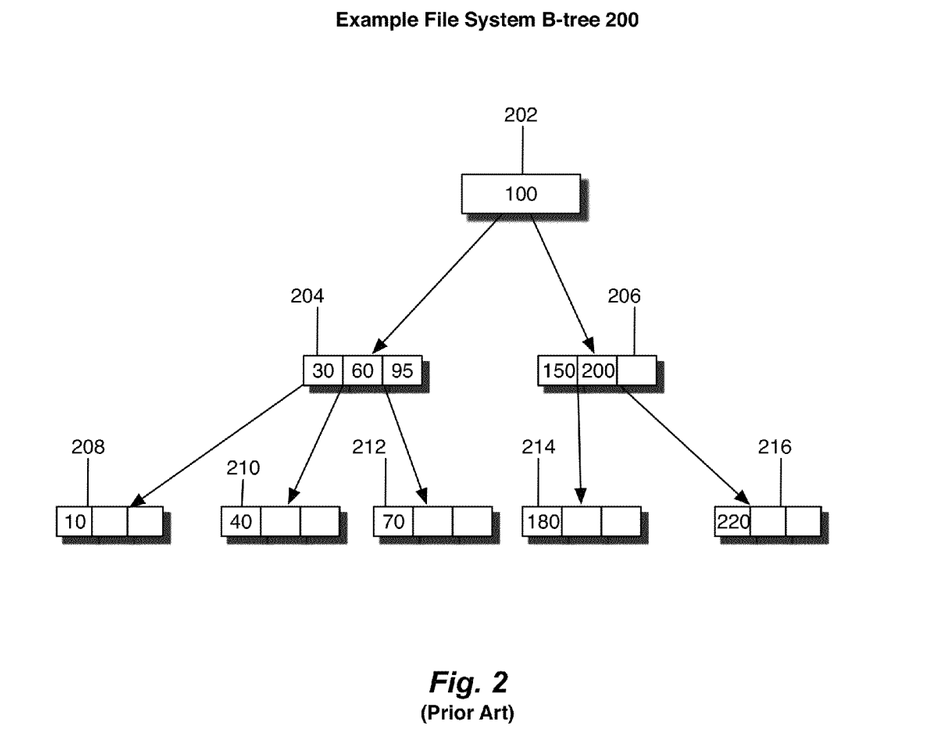
FIG. 2 shows an example of a typical file-system B-tree data structure as is known in the art.

FIG. 2 is a block diagram, which illustrates the operation of an example file system B-tree 200, as is known in the art. At a basic level, a B-tree operates in a similar manner as a binary-search tree if a single index root node is used, as in root node 202. If an operation is to be performed on a node with a key value that is less than the value contained in the root node, the left branch of the tree is searched. If the desired key has a value greater than the value contained in the root node, the right branch of the tree is searched. In the example B-tree 200, the root node contains a value of one hundred. If file system data is contained in a node with a key value of ten, such as in leaf node 208, the left branch from root node 202 will be taken to index node 204. An index node may contain several values and can be indexed in various ways. The example B-tree index node 204 can contain up to three index keys and up to four pointers. To continue a search for a node with a key value of ten, the pointer to the left of the key value of thirty will be used to navigate to node 208, which is a leaf node.

To navigate to leaf node 210 containing a key value of forty, the pointer to the right of the key value of thirty and to the left of the key value of sixty is used. To navigate to leaf node 212 containing a key value of seventy, the pointer to the right of the key value of sixty and to the left of the key value of ninety-five is used. To reach leaf node 214 containing the key value of one hundred and eighty, the right pointer from the root node 202 is taken initially, followed by the pointer between the index values of one hundred and fifty and two hundred in index node 206. To reach leaf node 216 containing a key value of two hundred and twenty, the pointer to the right of the key value of two hundred is taken from index node 206. For further discussion of the general use of B-trees in a hierarchical file system, see Hierarchical File System To Provide Cataloging And Retrieval Of Data, U.S. Pat. No. 4,945,475, which is hereby incorporated by reference.

Several variants of the B-tree can be used in various embodiments of a file system, depending on the file system need. In one embodiment, a hierarchical file system can use a B-tree to store mappings from file offsets to physical addresses on the storage device. In one embodiment, a hierarchical file system can use a B-tree to store byte-range lock data for file system locking operations. Concurrent access to data in some embodiments of a file system requires a byte-range locking mechanism, which ensures atomic access to data within the locked range. In one embodiment, leaf nodes of a B-tree can contain offset values, which can also act as key values, and also store size or length values, which can indicate the extent of the byte-range lock beyond the offset value. A B-tree Supporting Range Operations 300 is demonstrated in FIG. 3A and FIG. 3B.

Figure 3A:
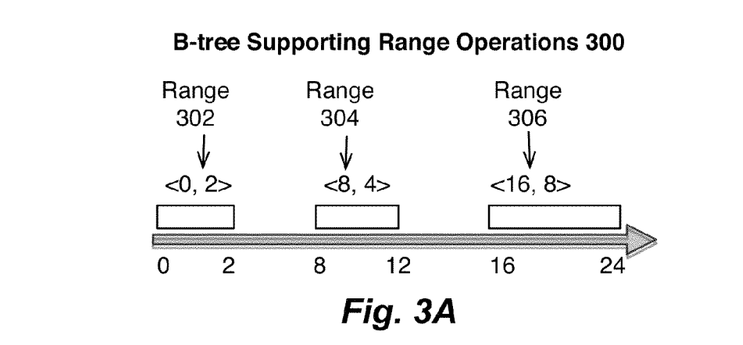
FIG. 3A is an illustration of example byte-lock data, which can be stored in a B-tree.

FIG. 3A is an illustration of example byte-range lock data, which can be stored in a B-tree. The range data can be stored in a manner illustrated by range 302 extending from byte offset zero to byte offset two. A range 304 from byte offset eight, extending four bytes to byte offset twelve, and a range 306 from byte offset sixteen with a range of eight, which extends to byte offset twenty-four is also illustrated. These offset and size values can be stored in a B-tree in a manner illustrated in FIG. 3B.

Figure 3B:
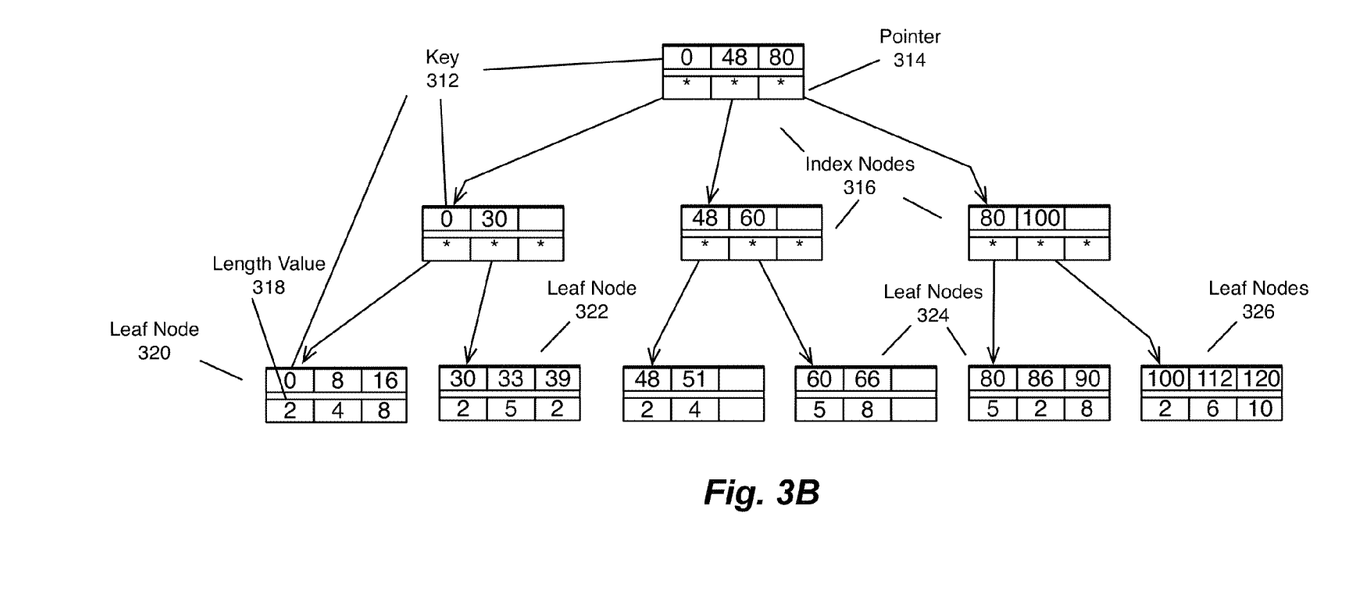
FIG. 3B is a block diagram illustrating one embodiment of a B-tree data structure supporting range operations as is used in one embodiment of the invention.

FIG. 3B illustrates an example B-tree used to store range lock data for a file system. The B-tree of FIG. 3B can contain as many as three keys 312 for each node indexed from zero to two. Additionally, index nodes 316 contain a child pointer 314 corresponding to each key. In one embodiment, the child pointer at each index node 316 points to index zero of the child node of the index node, which can be an index node 316 or a leaf node 320. In one embodiment, each key 312 is a byte offset for a range lock, and the size, or length value 318 of the range lock is stored in the data element of each leaf node, such as leaf node 320, and leaf node 322 through leaf node 326.

As is known in the art, a B-tree generally supports insert, delete, and search operations. Insert and delete operations, which can change data in a leaf node, can have corresponding ripple effects on the index nodes that can propagate up the tree to the root node as the tree is adjusted and rebalanced. For example, in the B-tree illustrated in FIG. 3B, if the byte-range from offset zero to offset two were deleted from the tree, each node up to the root node would require adjustment, which may result in a tree rebalance. Accordingly, if it is known that a search for a B-tree leaf node may result in tree changes, a lock of the tree generally takes place. However, locks may still be performed during read operations to ensure that the correct data is read, and that the node in question is not updated or deleted in the middle of the read cycle. Naïve locking algorithms may lock the entire tree, but more sophisticated locking algorithms can be implemented that can operate on one or more nodes at a time, as opposed to locking the entire tree.

In general, B-tree locks can be read locks or write locks. Before reading data, an operation upon a B-tree can acquire a read lock. Before writing data, an operation upon a B-tree can acquire a write lock. One operation cannot acquire a lock if a conflicting lock is in place. Multiple read locks do not conflict; however write locks can cause a conflict with a read lock, or another write lock, such that one operation waits until the earlier operation is complete before acting. In some B-tree based file system implementations, write locks can present concurrent access performance issues during a tree insert operation if a tree insertion results in one or more node splits. A node split can occur when an attempt is made to add data to a full node. If there is no space available in a leaf node, the leaf is split in two, and the existing keys and the new key are balanced between the two nodes and, if appropriate, the parent index node. If the parent index node would also require a split to insert a new key, the parent index node can be split as well. In this manner, it is possible for the split to propagate up the tree. This can require a lock on the entire traversal path from the root to a leaf node to be maintained until the insertion operation resolves. In the same manner, a deletion operation can propagate node merges up a B-tree.

In one embodiment of a file system, a write-exclusive lock is used which can resolve concurrent operation performance issues when using a B-tree for file system management by enabling a write lock which locks each individual node along the path from a leaf node to the root node, and unlocks ancestor nodes when a split or merge propagation will not occur. Like the write lock, the write-exclusive lock is an exclusive lock since it conflicts with any other locks, including read locks, write locks, or other write-exclusive locks. Unlike the write lock, the write-exclusive lock does not mark the locked node as dirty. The write-exclusive lock can be upgraded to the write lock, where the locked node is marked as dirty. In one embodiment, any node that has been marked as dirty will be flushed from one or more file system caches and written out to non-volatile memory, at a cost of some I/O delay. The write-exclusive lock can also be released without upgrading to the write lock, which will not cause any writes to the locked node in the future. Using write-exclusive lock avoids unnecessary dirtying nodes and thus avoids unnecessary writes to the storage device. In one embodiment, a pro-active split policy, which is known in the art, is one element enabling an exclusive write lock, which can enable atomic access to a specific node, but not require atomic access for each parent of the node up to the root node, as a write lock generally would. In one embodiment, if a B-tree insert operation traversal encounters a full index node, a pro-active split policy can split the full index node into two nodes and re-balance the keys between the nodes and, if necessary parent index nodes. This technique can improve efficiency by eliminating the need for a second traversal after insertion to split the required index nodes once it is determined that a split is actually necessary. Accordingly, a lock on a full index node that would be maintained for the duration of a tree traversal can be released after the index node is split.

An additional element enabling an exclusive write lock is an immediate unlock of a lock path once it is evident that ancestor nodes would not require modification. In one embodiment, a hierarchical file system uses the B-tree variant illustrated in FIG. 3B in conjunction with a method of exclusive write-locking to enable highly concurrent file system operations. In the B-tree variant illustrated in FIG. 3B, each key in an index node points to the key value in index zero of the respective child node. In such a tree, each time a key in index zero is modified, the parent index node of that node will require modification as well. If a leaf node with data at key index zero is modified, the key changes can propagate to the parent of the leaf node, and potentially several ancestor nodes of the leaf node. However, if data at a non-zero key index is modified, the parent index node will not be modified. As an example, if data <30, 2> at key index zero of leaf node 322 is removed from the B-tree, the first key of its parent index node can be changed from 30 to 33. However, if data at a non-zero key index is modified, the parent index node will not require modification. For example, if data <33, 5> is removed from the B-Tree, no index nodes need to be changed. It is to be understood, however, that the critical index is dependent upon the variant of the B-tree, and is not specifically limited to the first index (e.g. index zero). Embodiments using different B-tree variants which link to a different node index, or use different indexing methods, can be adjusted accordingly and without departing from the broader spirit and scope of the invention.

Figure 4:
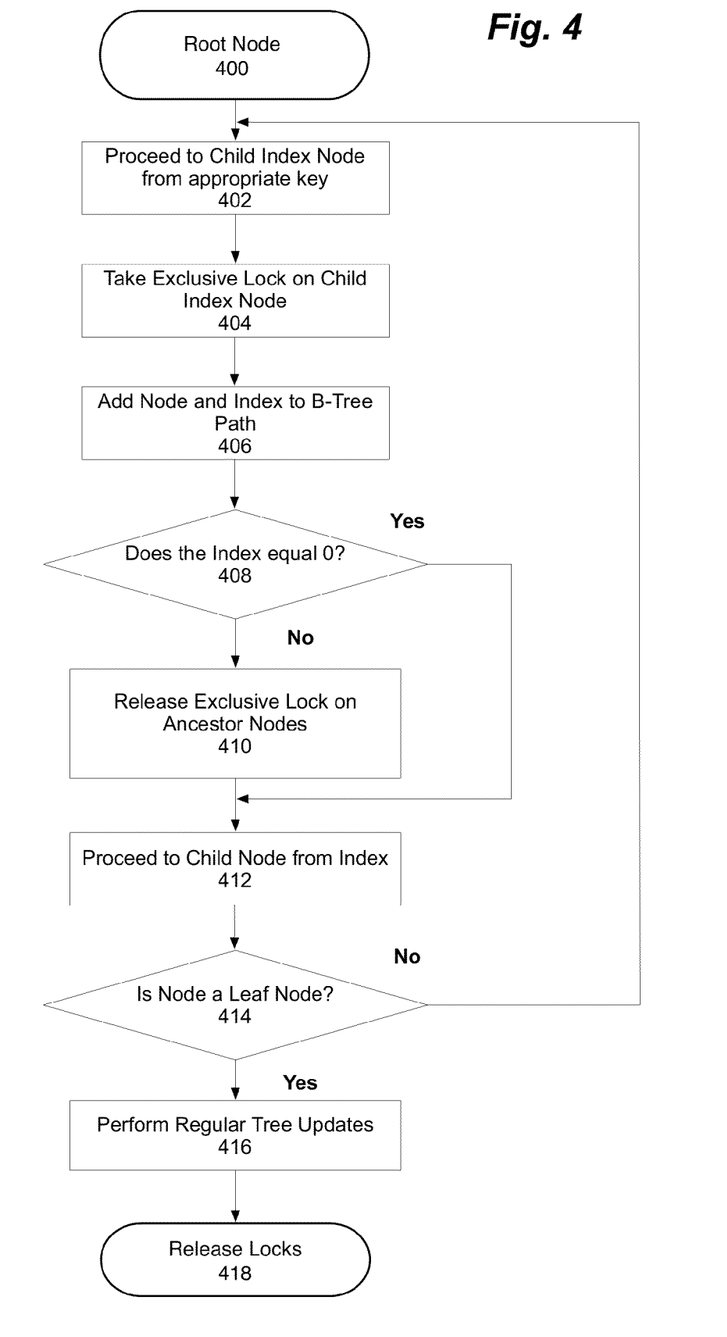
FIG. 4 is a flow chart of one embodiment of a method of highly concurrent B-tree access in a file system.

FIG. 4 is a flow chart of one embodiment of a method of highly concurrent B-tree access used in one embodiment of a hierarchical file system. In one embodiment, when traversing a file system B-tree to find a specific key value, the file system can perform an operation 400, which begins at a root node, and proceeds to an operation 402 which can select the appropriate key, and then follow the key pointer to the appropriate child index node for the search key value. In one embodiment, operation 404 can acquire an exclusive write lock on the child index node, which will lock that particular index node and prevent other threads or processes from acquiring a lock on that node. It is to be noted that other processes may be concurrently accessing the B-tree as well, and one embodiment of the method illustrated in FIG. 4 may, at some point, have to wait until a previous lock clears before an exclusive write lock can be acquired on a particular node.

In one embodiment, having acquired an exclusive write lock on the appropriate index node, operation 406 will search for the key in the index node indicated by the search key, and store the node pointer and selected index in a B-tree Path data structure, which records the search path taken from the root node to the leaf node containing the relevant data.

In one embodiment, the most likely scenario is that the key in the index node corresponding to the appropriate child node for the next level to the tree is stored in a nonzero index for the tree, which means the child node of the index node is not stored at the first pointer from the index node. Accordingly, in one embodiment, the likely outcome of operation 408 is that the appropriate key in the index node is not at index zero. This allows operation 410 to take place, in which the exclusive write locks on all ancestor nodes of the index nodes can be released, allowing other threads or processes to acquire locks upon those nodes if needed. Alternatively, if the index containing the key for the next tree level is equal to zero, or some other predetermined or known value, the ancestor locks are maintained.

In one embodiment, operation 412 can proceed to the next level of the tree to the child node of the index node via the pointer at the selected index. If, in operation 414, it is determined that the child node is an additional index node (e.g. not a leaf node), then the process returns to operation 402 and the selected index node is processed in the manner described above. If operation 414 determines that the child node is a leaf node containing the data, which is the object of the search, operation 416 can perform the regular tree updates on this node, which may be an insertion, deletion, or some other write operation on the node. At this point, the relevant locks upon ancestor nodes may still be in place for each unbroken chain of tree level traversals where the pointer at index zero was selected.

In one embodiment, the leaf node modifications require an index node split and rebalance operation, or alternatively, an index node merge operation. In such embodiment, no lock delay is required because the index nodes to be modified are still locked. However, the index nodes that will not be modified are free of the lock condition and can be accessed by other threads or processes. Alternatively, one embodiment can use a pro-active split method, which can split full or nearly full index nodes during traversal, or at some point before unlocking the ancestor nodes when a intermediate unlock is allowed during operation 410. In one embodiment, once the leaf node operation is performed, a completion operation 418 can release any remaining locks for this tree update. In one embodiment, locks are released in a bottom up manner, which means the lock on the leaf node is released, followed by each locked parent of the leaf node. In one embodiment, locks are released in a top down fashion, in which the most senior locked node is unlocked, followed by subsequent child nodes until the leaf node is unlocked.

Figure 5:
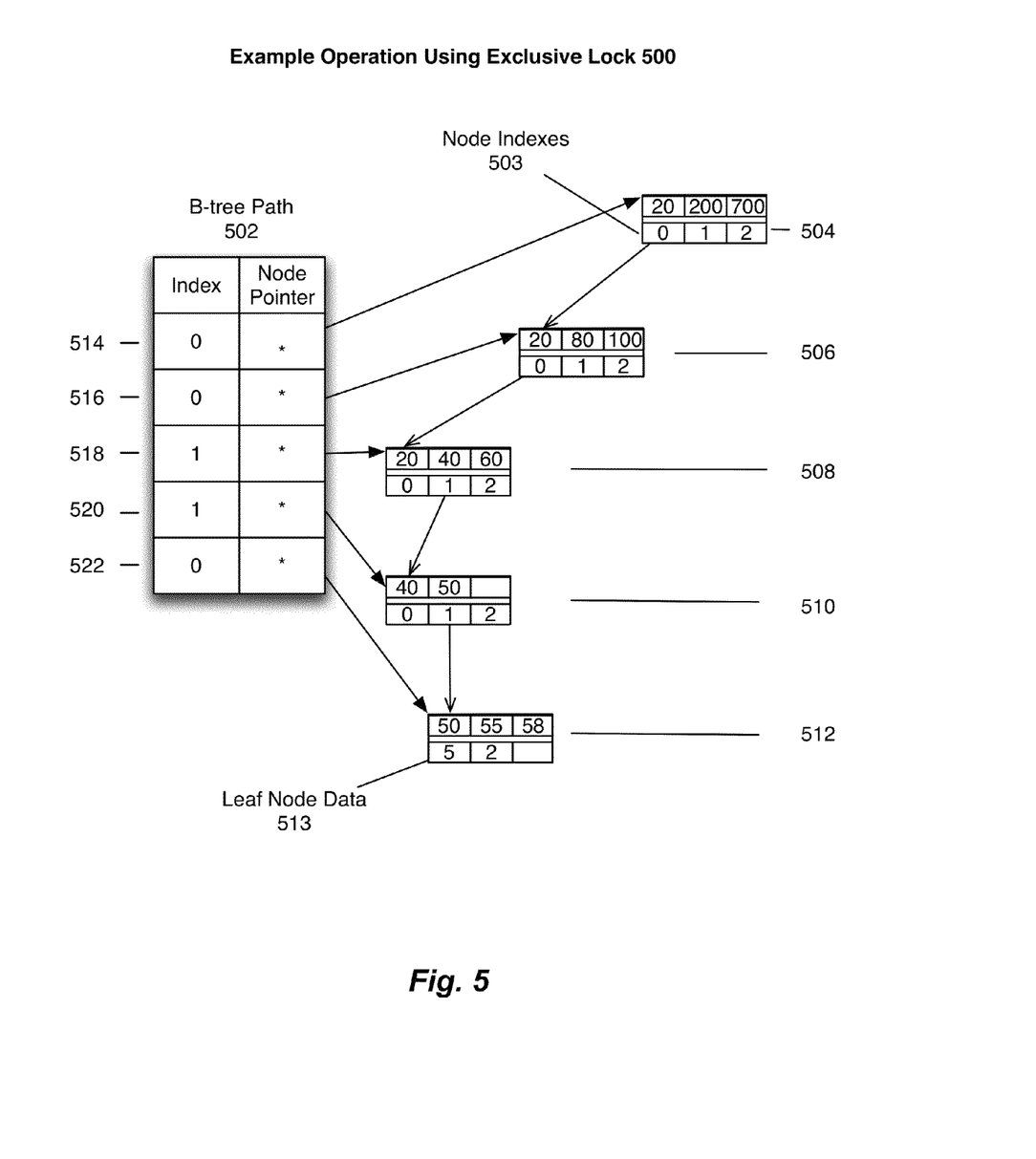
FIG. 5 is a diagram illustrating one embodiment of the traversal and lock method, and the B-tree Path data structure.

FIG. 5 is a diagram illustrating one embodiment of the traversal and lock method, as well as one embodiment of the B-tree Path data structure discussed in FIG. 4 above. In one embodiment, a B-tree Path 502 data structure stores the index and pointer to each index node encountered during tree traversal for a given search key, which can be used to unwind a chain of exclusive write locks acquired during tree traversal. In one embodiment, each index node contains multiple node indexes, such as the set of node indexes 503 ordered from zero to two, in the illustrated example. It is to be noted that the number of index nodes and the number of indexes per node illustrated in FIG. 5 is for example purposes only, and index nodes in embodiments of the invention are not limited as such.

In one embodiment, an index node, such as index node 504 contains three keys, twenty, two-hundred and seven hundred, in index zero, one, and two respectively. An exclusive lock can be acquired on index node 504, to begin a search operation for a key value of 50, which is stored in example leaf node 512. Once the lock is acquired, index zero of index node 504, the index having a key value of twenty, can be selected, and a pointer to the index node 504 can be stored at entry 514 in the B-tree Path data structure 502, along with the selected index value of zero. The child node of index node 504 is index node 506, which contains keys of twenty, eighty and one hundred in index zero, one, and two respectively. An exclusive lock on index node 506 can be acquired, and a pointer to index node 506 can be stored in entry 516 of the B-tree Path data structure 502. The key for the next level is at index zero, so the index value of zero is also stored in entry 516.

In the example illustrated in FIG. 5, index node 506 is not a leaf node; at least an additional tree level can be traversed from the pointer at the key value of twenty at index zero of index node 506. Accordingly an exclusive lock can be acquired for index node 508, the pointer to which can be stored in entry 518 of the B-tree Path data structure 502. In this case, the highest key in index node 508 which is not greater than the search key is the key value of forty at index one. Accordingly, the index value of one is stored with the pointer to index node 508 at entry 518 in the B-tree Path data structure 502. In one embodiment, the write exclusive locks upon ancestor index node 506 and index node 504 can be released, because a change in index node 508, or the child nodes of index node 508, will not require a key modification in this implementation of the B-tree data structure.

In one embodiment, the index node to index node traversal continues in the manner discussed above for index node 510, which is stored in the B-tree Path data structure 502 at entry 520 along with the index value of one. The non-zero index value indicates that, in one embodiment, the exclusive write lock upon index node 508 can be released before stepping to node 512. Node 512 does not have any child nodes, and thus is a leaf node. In one embodiment, an exclusive lock can be acquired upon leaf node 512, and a pointer to leaf node 512 can be stored in entry 522 of the B-tree Path data structure 502 along with index zero, which contains the search key value of fifty. The tree operation can be performed, and the exclusive write locks on node 512 and node 510 can be released in a bottom up or top down fashion. In additional to adding entries, in one embodiment, the B-tree Path data structure can remove associated entries once a lock on an index node has been released. Accordingly, intermediate unlocks of ancestor nodes can result in a deletion of those entries from the path data structure.

Figure 6A:
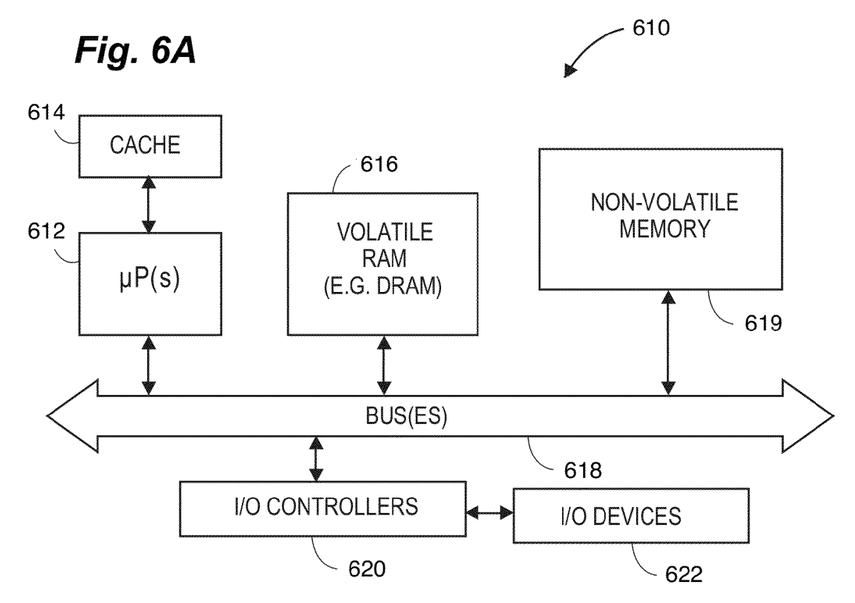
FIG. 6A is a block diagram of a computing system according to one embodiment of the invention.

FIG. 6A shows an example of a computing system 610, which is a form of a data processing system, which can be employed with one or more embodiments described herein.

The system 610 can be a desktop computer system or a laptop computer system or a Smartphone, or some other electronic devices or consumer electronic devices. The system 610 can include one or more microprocessors or other logic units 612 coupled to an optional cache 614 which in one embodiment can be SRAM, as known in the art. The one or more microprocessors 612 are coupled to the rest of the system through one or more buses 618, which couple the one or more microprocessors 612 to main memory, which can be volatile RAM 616. In one embodiment, volatile RAM can be the conventional DRAM used in computer systems, where the DRAM is coupled through the bus to the rest of the components in the system 610. The system 610 can also include one or more input/output controllers 620, which couple one or more input/output devices 622 to the rest of the system through the one or more buses 618. The system 610 also includes a non-volatile memory 619 which can be a composite disk, such as a combination of flash memory, which is a form of a solid state, drive and a conventional magnetic hard drive.

Figure 6B:
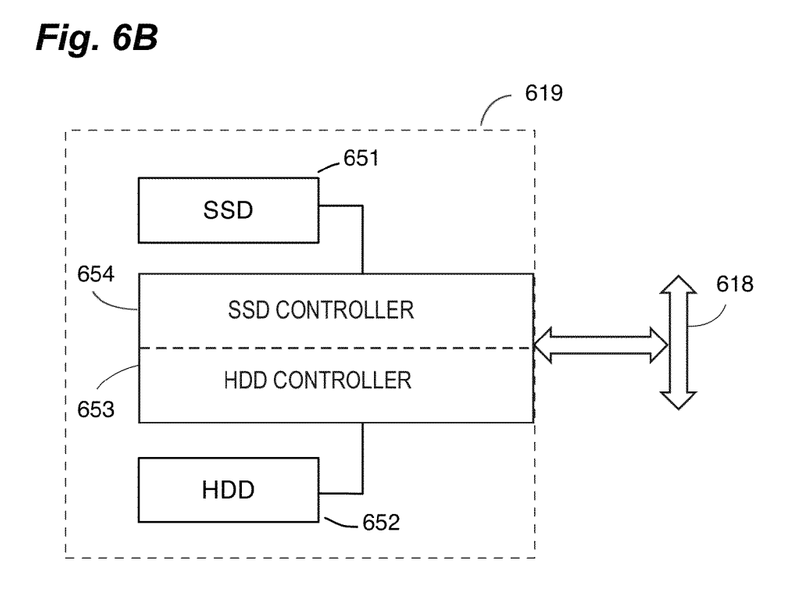
FIG. 6B shows one embodiment of a non-volatile storage device according to one embodiment of the invention.

FIG. 6B shows an example of a non-volatile storage device, which in one embodiment can be a composite disk. The non-volatile memory 619 includes a solid state drive 651 and a magnetic hard drive 652 which can be treated as a single logical volume, or block device by a file system and an operating system and are controlled by one or more controllers, such as controller 653 which includes a solid state drive controller, and controller 654 which includes a hard disk drive controller. The one or more controllers couple the composite drive shown in FIG. 6A to the rest of the components in system 610 through the bus 618. It will be appreciated that flash memory is one form of a fast non-volatile storage device and that other fast storage devices can alternatively be used in conjunction with a slower storage device which can be a conventional magnetic hard drive or other non-volatile storage devices which are slower than the faster storage device. It will be understood that in this description a reference to SSD or HDD will be construed to mean the faster and the slower non-volatile storage devices and will not be construed as being limited to, or specific to any storage device technology. Moreover, embodiments of the highly concurrent B-tree method, and associated hierarchical file system are applicable to a multitude of data storage devices, including data storage devices as are known in the art. Additionally, embodiments of the B-tree method disclosed are of general applicability to file systems of many types.

In the foregoing specification, the invention has been described with reference to specific embodiments thereof. However, it will be evident that various modifications and changes can be made thereto without departing from the broader spirit and scope of the invention. The specification and drawings are, accordingly, to be regarded in an illustrative rather than a restrictive sense.

What is claimed is:

1. A non-transitory computer-readable medium with instructions stored therein, the instructions, when executed by a processor, cause the processor to perform operations, the operations comprising:
   acquiring an exclusive lock on a first node in an ordered tree data-structure, acquiring the exclusive lock comprising acquiring atomic access to a node without marking the node for a cache flush;
   adding an entry to a path data structure, the entry including an identifier of the first node and an index on the first node;
   releasing each exclusive lock between the first node and the root of the ordered tree data-structure when the value of the index on the first node is not equal to a predetermined value, the predetermined value indicating the index in the first node is targeted by a pointer of a parent of the first node;

proceeding to a second node addressed at the index on the first node;

acquiring an exclusive lock on the second node;

updating the second node if the second node is a leaf node; and releasing any remaining exclusive locks between the second node and the root of the ordered tree data-structure after updating the second node.

2. The computer-readable medium of claim 1, wherein one or more exclusive locks are released in a top-down manner.

3. The computer-readable medium of claim 1, wherein one or more exclusive locks are released in a bottom-up manner.

4. The computer-readable medium of claim 1, wherein the predetermined value is zero.

5. The computer-readable medium of claim 1, wherein the ordered tree data structure is a B-tree data structure.

6. A hierarchical file system for providing storage and retrieval of data on a storage device of a data processing system, the file system comprising:

an ordered tree indexing structure, to store file system data, the ordered tree indexing structure having a root node, one or more index nodes, and one or more leaf nodes;

a path indexing structure, to store a set of locked nodes along a tree traversal path; and a non-transitory computer-readable storage media, to store computer-readable instructions which, when executed by a processor of the data processing system, cause the processor to perform operations to manage the file system, the operations to:

acquire an exclusive lock on a first node in the ordered tree indexing structure, wherein the exclusive lock comprises atomic access to an individual node, and wherein the exclusive lock does not mark the node for a cache flush, insert, into the path indexing data structure, an entry including an identifier of the first node and an index on the first node, when the index on the first node has a value that is not equal to a predetermined value indicating the index in the first node is targeted by a pointer of a parent of the first node release any exclusive lock on each node between the first node and the root node using the path indexing structure entry associated with the node, wherein the entry associated with the node is deleted after releasing the exclusive lock, proceed to a second node in the ordered tree indexing structure, wherein the second node is addressed by a pointer in the first node, acquire an exclusive lock on the second node in the tree indexing structure, update data stored in the second node, if the second node is a leaf node, and release the exclusive locks between the second node and the root of the ordered tree indexing structure.

7. The hierarchical file system of claim 6, wherein the ordered tree indexing structure is a B-tree data structure.

8. The hierarchical file system of claim 7, wherein one or more exclusive locks are released in a top-down manner.

9. The hierarchical file system of claim 7, wherein one or more exclusive locks are released in a bottom-up manner.

10. The hierarchical file system of claim 9, wherein the predetermined value is zero.

11. A computer-implemented method of concurrent access to tree data structures in a file system, the method comprising:

acquiring an exclusive lock on a first node in an ordered tree data-structure, acquiring the exclusive lock comprising acquiring atomic access to a node without marking the node for a cache flush;

in response to acquiring the exclusive lock, adding an entry to a path indexing data structure, the entry including an identifier of the first node and an index on the first node;

releasing, using the entries stored in the path indexing data structure, the exclusive lock held on each node between the first node and the root of the ordered tree data-structure when the value of the index on the first node is not equal to a predetermined value, the predetermined value indicating the index in the first node is targeted by a pointer of a parent of the first node;

proceeding to a second node addressed at the index on the first node;

acquiring an exclusive lock on the second node;

updating the second node if the second node is a leaf node; and releasing any remaining exclusive locks between the second node and the root of the ordered tree data-structure after updating the second node.

12. The computer-implemented method of claim 11, wherein the ordered tree data structure is a B-tree data structure, and wherein the predetermined value is zero.

13. The computer-implemented method of claim 12, wherein one or more exclusive locks are released in a top-down manner.

14. The computer-implemented method of claim 13, wherein one or more exclusive locks are released in a bottom-up manner.

* * * * *